US009720229B2

(12) United States Patent
Sato

(10) Patent No.: US 9,720,229 B2
(45) Date of Patent: Aug. 1, 2017

(54) HEAD-MOUNTED DISPLAY

(71) Applicant: Sony Corporation, Tokyo (JP)

(72) Inventor: Masaru Sato, Kanagawa (JP)

(73) Assignee: Sony Corporation, Tokyo (JP)

( * ) Notice: Subject to any disclaimer, the term of this patent is extended or adjusted under 35 U.S.C. 154(b) by 187 days.

(21) Appl. No.: 14/577,016

(22) Filed: Dec. 19, 2014

(65) Prior Publication Data

US 2015/0185478 A1    Jul. 2, 2015

(30) Foreign Application Priority Data

Dec. 26, 2013 (JP) ................................. 2013-269770

(51) Int. Cl.
| | |
|---|---|
| *G09G 5/00* | (2006.01) |
| *G02B 27/01* | (2006.01) |
| *F21V 8/00* | (2006.01) |
| *G02B 27/22* | (2006.01) |

(52) U.S. Cl.
CPC ....... *G02B 27/017* (2013.01); *G02B 27/0176* (2013.01); *G02B 27/0179* (2013.01); *G02B 6/0011* (2013.01); *G02B 27/225* (2013.01); *G02B 2027/0178* (2013.01); *G09G 2300/04* (2013.01)

(58) Field of Classification Search
CPC .................................................. G02B 27/017
USPC ............................................................ 345/8
See application file for complete search history.

(56) References Cited

U.S. PATENT DOCUMENTS

| | | | | | |
|---|---|---|---|---|---|
| 5,212,966 | A | * | 5/1993 | Minami ............... | A44C 5/0053 2/338 |
| 5,815,126 | A | * | 9/1998 | Fan ....................... | G02B 27/017 345/7 |
| 2004/0113867 | A1 | * | 6/2004 | Tomine ............... | G02B 27/0172 345/8 |
| 2008/0291277 | A1 | * | 11/2008 | Jacobsen ............ | G02B 27/0172 348/158 |
| 2011/0273365 | A1 | * | 11/2011 | West ................... | G02B 27/0176 345/8 |

FOREIGN PATENT DOCUMENTS

JP        2013-150118 A    8/2013

* cited by examiner

*Primary Examiner* — Jason Olson
(74) *Attorney, Agent, or Firm* — Wolf, Greenfield & Sacks, P.C.

(57) ABSTRACT

A head-mounted display includes a first display portion, a second display portion, and a support portion. The first display portion is capable of presenting an image to an eye of a user. The second display portion is capable of presenting an image to the other eye of the user. The support portion has a band member and a first communication member. The band member connects the first display portion and the second display portion with each other and is curved to be disposed around a head portion of the user. The first communication member is disposed in the band member and electrically connects the first display portion and the second display portion.

16 Claims, 6 Drawing Sheets

HEAD-MOUNTED DISPLAY

CROSS REFERENCE TO RELATED APPLICATIONS

This application claims the benefit of Japanese Priority Patent Application JP 2013-269770 filed Dec. 26, 2013, the entire contents of which are incorporated herein by reference.

BACKGROUND

The present technology relates to a head-mounted display used by being mounted on a head portion of a user.

There is known a head-mounted display (hereinafter, also referred to as HMD) which is mounted on a head portion of a user and presents an image to the user on a display disposed in front of eyes of the user.

In recent years, a glasses-type HMD has been developed (see, for example, Japanese Patent Application Laid-open No. 2013-150118). Typically, a glasses-type HMD is provided with two display portions and a pair of temple portions. The two display portions are capable of presenting an image to both eyes of a user. The pair of temple portions supports the display portions and is capable of being mounted on a head portion of the user.

SUMMARY

The glasses-type HMD has the structure in which the temple portions each press temporal portions (sides of a head) of a user with a predetermined force. However, various users have various sizes of their heads, so it is very difficult to provide appropriate fits to all users.

In view of the circumstances as described above, it is desirable to provide a head-mounted display capable of obtaining an appropriate fit while reducing fatigue during wearing.

According to an embodiment of the present technology, there is provided a head-mounted display including a first display portion, a second display portion, and a support portion.

The first display portion is capable of presenting an image to an eye of a user.

The second display portion is capable of presenting an image to the other eye of the user.

The support portion includes a band member and a first communication member. The band member connects the first display portion and the second display portion with each other and is curved to be disposed around a head portion of the user. The first communication member is disposed in the band member and communicatively connects the first display portion and the second display portion.

The head-mounted display is provided with the support portion having the band member disposed around the head portion of the user. Therefore, it is possible to stably dispose the display portion in front of the eyes of the user without increasing a pressing force to the head portion of the user. As a result, it is possible to obtain an appropriate fit while reducing fatigue during wearing.

Further, the first communication member that communicatively connects the first display portion and the second display portion is disposed in the band member. Therefore, it is possible to reduce thickness and weight of the first and second display portions. As a result, it is possible to obtain a good wearing feeling with less fatigue while suppressing the increase in weight and thickness of the first and second display portion.

The band member may have a first molded body formed of a synthetic resin material, and the first communication member may be insert-molded in the first molded body.

As a result, the first communication member is held integrally with the band member.

The band member may further have a second molded body that is formed of a material having a higher elasticity than the synthetic resin material and covers at least an outer circumferential surface of the first molded body.

As a result, it is easy to deform the band member in a diameter expansion direction of the band member, and it is possible to relax a stress applied to the first communication member at the time of the deformation. In addition, a tactile sense of the support portion is improved, thereby increasing design quality.

The second molded body may have a plurality of columnar portions each having a height that reaches the first communication member from the outer circumferential surface of the first molded body.

As a result, it is possible to relax the stress applied to the first communication member by using the elasticity of the second molded body.

The plurality of columnar portions may be distributed periodically around the second molded body.

The first communication member may be disposed on an outer circumferential side from a neutral plane of the band member.

As a result, it is possible to prevent a tensile stress from being applied on the first communication member at the time when the band member is deformed in the diameter expansion direction and protect the first communication member.

The support portion may further have an ear-hook portion disposed on an inner circumferential surface of the band member.

As a result, it is possible to obtain a stable wearing feeling. In addition, it is possible to reduce a pressing force to the head portion of the user by the ear-hook portion, which can reduce a reaction force of the pressing force applied to the display portion. As a result, it is possible to prevent convergence deviation of the display images.

The ear-hook portion may be formed slideably in a circumferential direction of the band member.

As a result, the position of the ear-hook portion can be adjusted. Therefore, it is possible to provide appropriate fit to all users.

The ear-hook portion may have an attachment end portion attached to the band member, and a belt-like portion attached to the attachment end portion and deformable in a radial direction of the band member.

The head-mounted display may further include a controller configured to control the first display portion and the second display portion. In this case, the support portion further has a second communication member. The second communication member is disposed in the band member and electrically connects the first display portion with the controller.

The second communication member may be built in at least a part of the band member in the circumferential direction.

The second communication member may be disposed on an inner circumferential side from the first communication member in the band member.

As a result, it is possible to store the second communication member in the band member while securing a space for disposing the first communication member.

The band member may have a bottom surface portion where a groove portion on which the second communication member is mounted is formed, and the support portion may further have a support body that supports the second communication member and is fixed to the bottom surface portion.

As a result, it is possible to easily build the second communication member in the band member after the band member is manufactured.

The first communication member may be a conductive member.

The first communication member may be an optical fiber.

The first communication member may be a conductive member that forms an electrical connection.

The support portion may include a second communication member being disposed in the band member The second communication member may communicatively connects the first display portion to a controller.

The head-mounted display may further include a controller configured to output image signals. The second communication member may communicatively connect the first display portion to the controller.

The second communication member may be disposed, at least in part, on an inner circumferential side from a neutral plane of the band member According to another embodiment of the present technology, there is provided a head-mounted display including a first display portion, a second display portion, and a support portion.

The first display portion is capable of presenting an image to an eye of a user.

The second display portion is capable of presenting an image to the other eye of the user.

The support portion has a band member and an ear-hook portion that is disposed on an inner circumferential surface of the band member. The band member connects the first display portion and the second display portion with each other and is curved to be disposed around a head portion of the user.

According to another embodiment of the present technology, there is provided a method of making a device. The method includes disposing a first communication member in a first cavity formed from a first mold and a second mold, and injecting a first synthetic resin into the first cavity to form a first molded body.

Disposing a first communication member in a first cavity may include holding the first communication member by applying a vacuum to a plurality of hollow holding pieces that are in contact with the first communication member.

An outer circumferential surface of the first molded body may include a plurality of holes formed by the placement of the plurality of hollow holding pieces during injection of the first synthetic resin.

The method may further include disposing the first molded body in a second cavity formed from a third mold and a fourth mold, and injecting a second synthetic resin into the second cavity to form a second molded body such that the plurality of holes are filled with the second synthetic resin.

The method may further include disposing the first molded body in a second cavity formed from a third mold and a fourth mold.

By the head-mounted display, and the methods for making the same, described above, it is possible to obtain an appropriate, stable fit while reducing fatigue during wearing. Further, the pressing force to the head portion of the user by the ear-hook portion, so it is possible to also reduce the reaction force of the pressing force applied to the display portion. As a result, it is possible to prevent the convergence deviation of the display images.

As described above, according to the embodiments of the present technology, it is possible to obtain the appropriate fit while reducing fatigue during wearing.

It should be noted that the effects disclosed herein are not limited, any one of the effects described in the present disclosure may be obtained.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, an embodiment of the present disclosure will be described with reference to the drawings.

Figure 1:
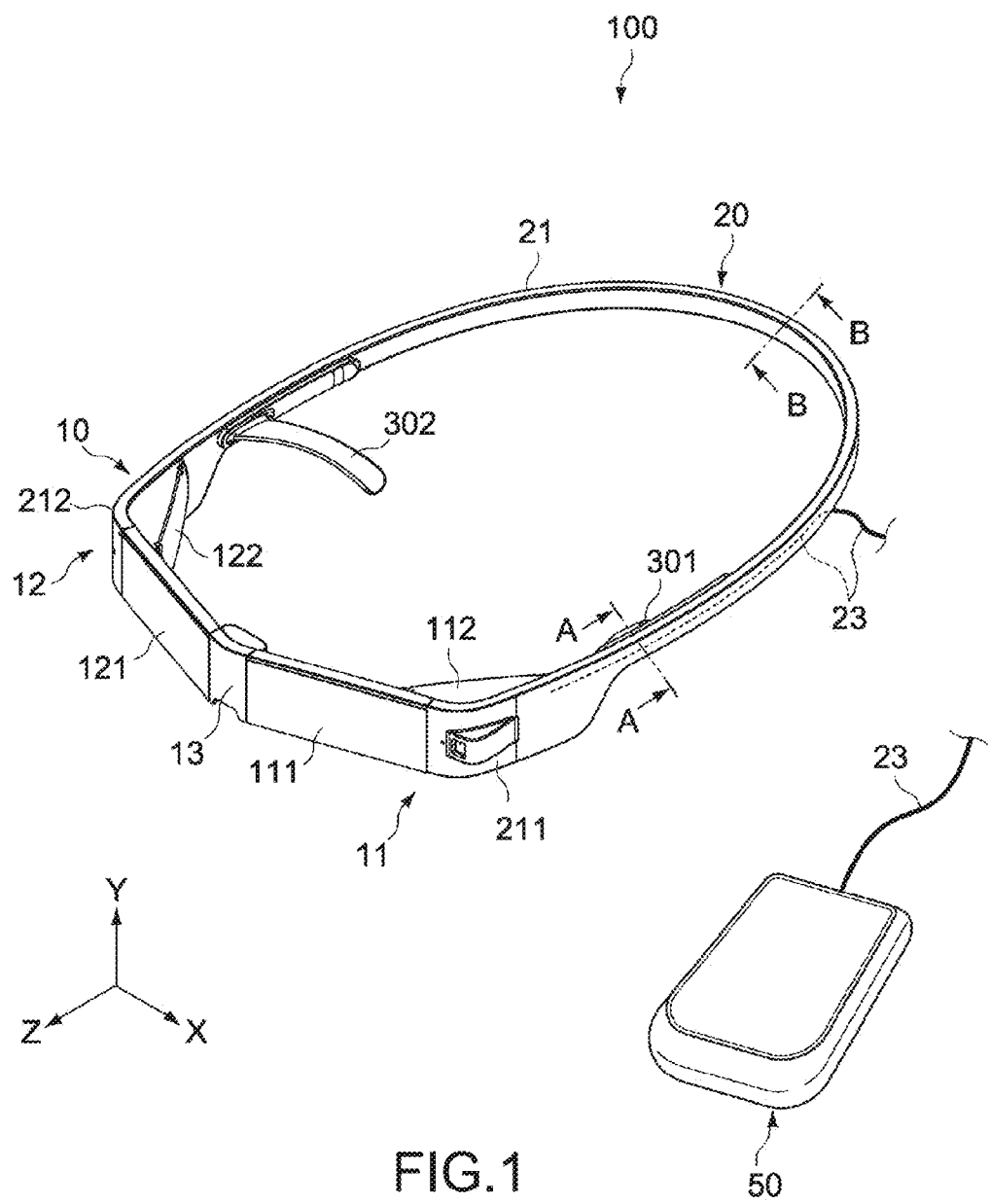
FIG. 1 is a perspective view showing an entire head-mounted display according to an embodiment of the present technology.

FIG. 1 is a perspective view showing an entire head-mounted display according to an embodiment of the present technology. In the figures, X, Y, and Z axes indicate three-axis directions perpendicular to each other. The X axis, the Y axis, and the Z axis indicate a lateral direction, a height (vertical) direction, and a front-back direction, respectively.

(Structure of Head-Mounted Display)

A head-mounted display 100 according to this embodiment includes a display portion 10 and a support portion 20 and is formed to have approximately annular shape entirely.

The display portion 10 includes a first display portion 11, a second display portion 12, and a connection portion 13. The support portion 20 is curved between the first display portion 11 and the second display portion 12 so as to be disposed around a head portion of a user.

(Display Portions)

The first display portion 11 has a first display plate 111 and a first optical unit 112 that projects an image on the first display plate 111. Similarly, the second display portion 12 has a second display plate 121 and a second optical unit 122 that projects an image on the second display plate 121.

The first and second display plates 111 and 121 are disposed in front of eyes of the user and are capable of displaying an image to be presented to the user. The first and second display plates 111 and 121 are formed of translucent light guide plates capable of causing images projected from the first and second optical units 112 and 122 to exit to a left eye and a right eye of the user, respectively. That is, the first display plate 111 displays an image for a left eye, and the second display plate 121 displays an image for a right eye. The images presented to the user by the first and second display portions 11 and 12 may be 2D images or 3D images.

The first and second optical units 112 and 122 are fixed to the first and second display plates 111 and 121, respectively. The structures of the first and second optical units 112 and 122 are not particularly limited, as long as the units 112 and 122 can project the images to the first and second display plates 111 and 121. Typically, the first and second optical units 112 and 122 each have an image forming element, an optical lens that projects an image formed by the image forming element to the first and second display plates 111 and 121, a cabinet that contains those, and the like. As the image forming element, a liquid crystal panel may be used, or a self-emitting panel such as an LED and an EL element may be used.

The first display plate 111 and the second display plate 121 are connected to each other through the connection portion 13. The connection portion 13 connects the first and second display plates 111 and 121 so that the first and second display plates 111 and 121 have a predetermined angle relationship with respect to the X, Y, and Z axes. On an inner circumferential side of the connection portion 13, a nose pad (not shown) is provided.

(Support Portion)

Figure 2:
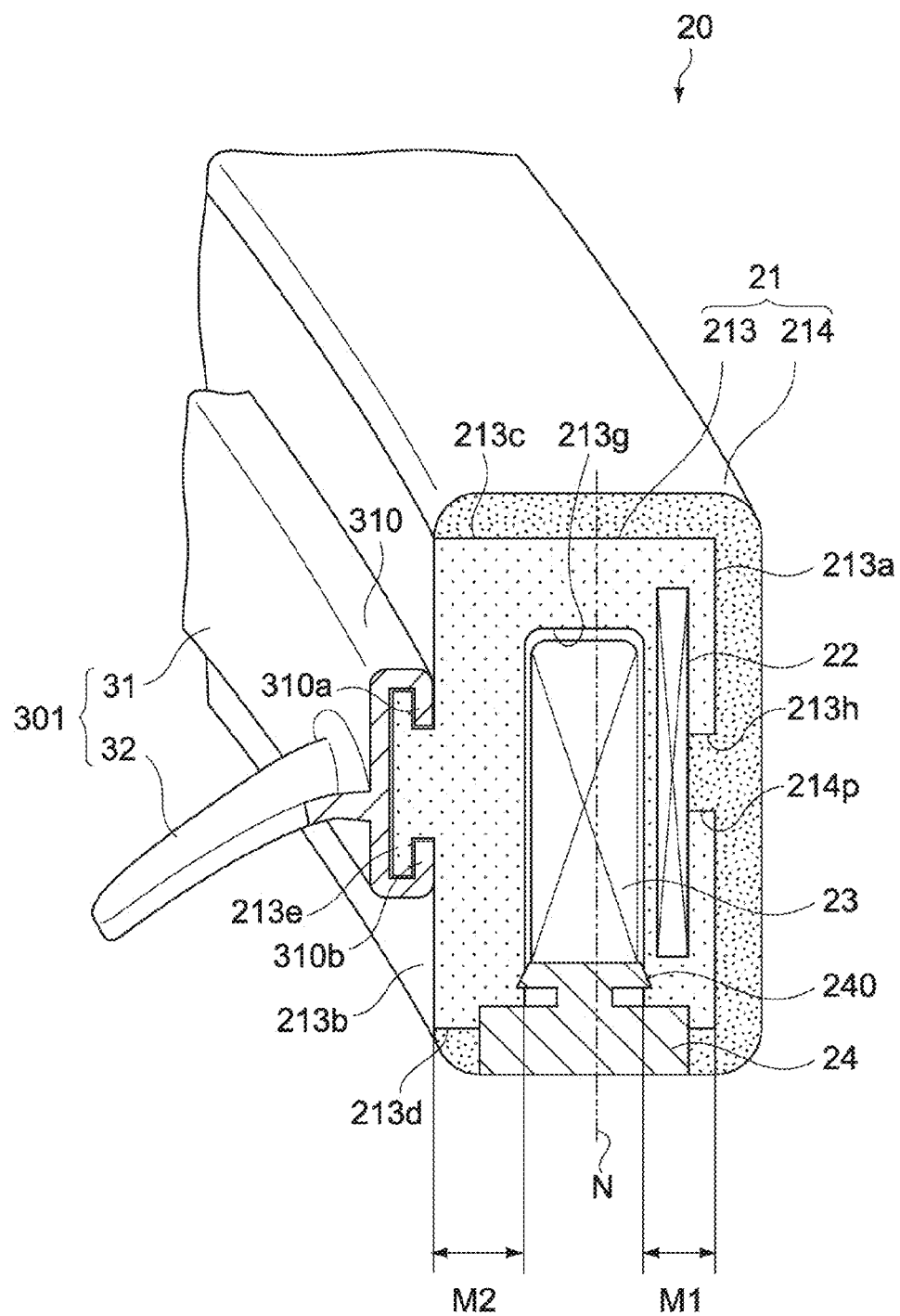
FIG. 2 is a schematic cross-sectional view of the head-mounted display taken along the line A-A of FIG. 1.
Figure 3:
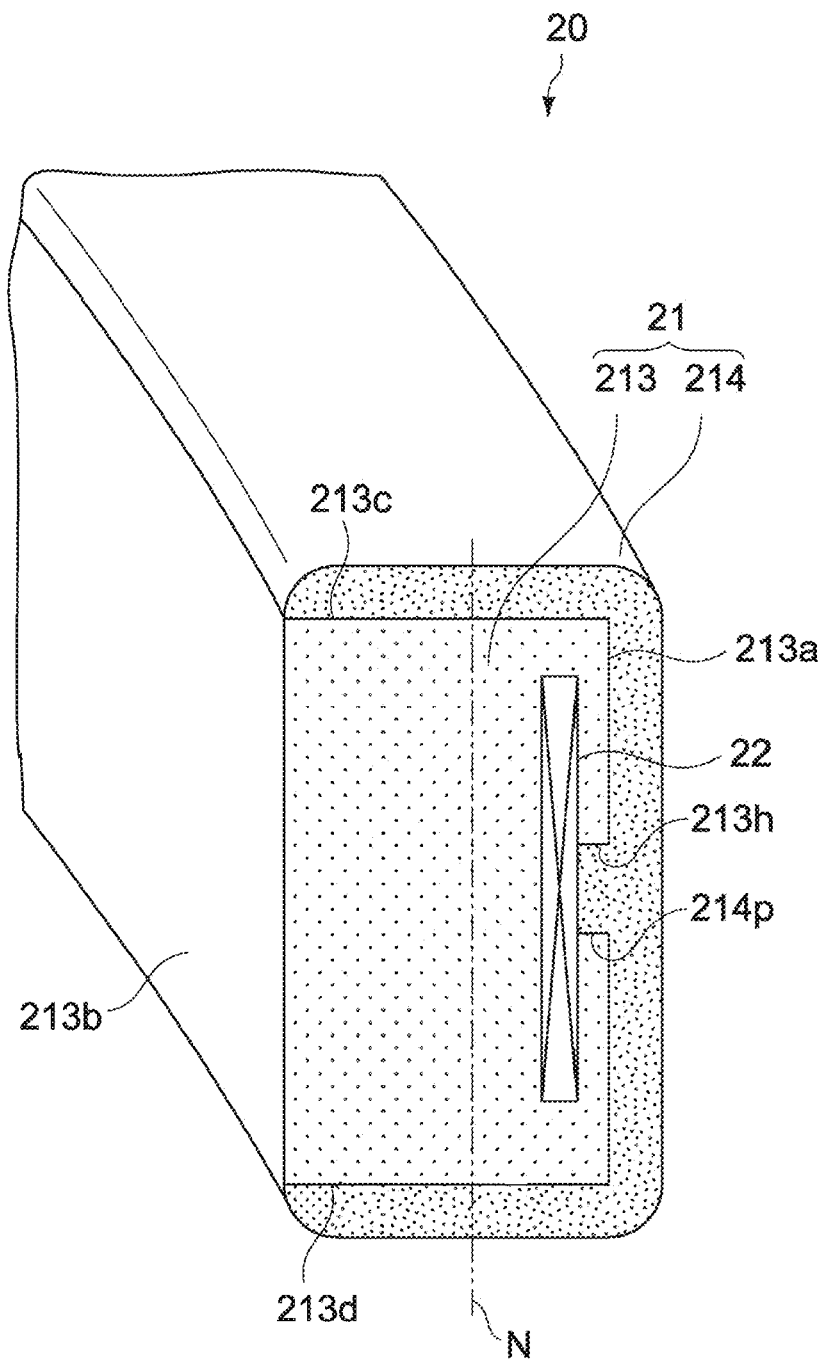
FIG. 3 is a schematic cross-sectional view of the head-mounted display taken along the line B-B of FIG. 1.

The support portion 20 mechanically and electrically connects the first display portion 11 and the second display portion 12. FIG. 2 is a schematic cross-sectional view of the head-mounted display taken along the line A-A of FIG. 1. FIG. 3 is a schematic cross-sectional view of the head-mounted display taken along the line B-B of FIG. 1.

(Band Member and First Communication Member)

The support portion 20 has a band member 21 and a first communication member 22.

The band member 21 is formed as a core material of the support portion 20 and has a first end portion 211 connected with the first display portion 11 and a second end portion 212 connected with the second display portion 12. The band member 21 connects the first display portion 11 and the second display portion 12 to each other and is curved so as to be disposed around the head portion of the user.

The band member 21 is constituted of two-color molded body of a first molded body 213 and a second molded body 214.

The first molded body 213 is formed of an injection molded body of a synthetic resin material (first synthetic resin material). The first molded body 213 is curved around the Y axis. The first molded body 213 has an approximately rectangular cross section and has an outer circumferential surface 213a, an inner circumferential surface 213b, a top surface (upper surface) 213c, and a bottom surface (lower surface) 213d. The thickness of the first molded body 213 (which corresponds to a distance between the outer circumferential surface 213a and the inner circumferential surface 213b) is not particularly limited, for example, 3 mm to 5 mm.

For the resin material that forms the first molded body 213, a material having a low elasticity and a high toughness or a material having a low brittleness and a high viscosity, for example, polyamide-based resin is used. As a result, it is possible to increase durability against an external force (tensile stress, bending stress, torsional stress, or the like) applied to the band member 21.

The first communication member 22 is formed of a flexible wiring substrate that electrically connects the first optical unit 112 and the second optical unit 122. The first communication member 22 is formed in the first molded body 213 by insert molding, thereby being buried in the first molded body 213. As a result, the first communication member 22 is held integrally with the band member 21. While the first communication member 22 is described herein as a conductive member that provides an electrical connection, embodiments are not limited as such. For example, the first communication member 22 may be an optical fiber that allows optical communication between two or more components such that the two or more components are communicatively connected.

As shown in FIG. 2 and FIG. 3, the first communication member 22 is disposed on an outer circumferential side with respect to a neutral plane N of the band member 21. The neutral plane N refers to a plane which is not expanded and contracted in a longitudinal direction (circumferential direction of band member 21) before and after the band member 21 is bent and deformed about the Y axis. Therefore, by disposing the first communication member 22 on the outer circumferential side with respect to the neutral plane N, a tensile stress is prevented from being applied to the first communication member 22, when the band member 21 is deformed in a diameter expansion direction. As a result, it is possible to protect the first communication member 22.

The second molded body 214 is formed of an injection molded body made of a synthetic resin material (second synthetic resin material) and covers at least the outer circumferential surface 213a of the first molded body 213. The resin material that forms the second molded body 214 is not particularly limited, as long as the material has a high adhesion with the synthetic resin material that forms the first molded body 213 and is more excellent in elasticity than the synthetic resin material (low modulus of elasticity). For example, an elastomer material such as fluorinated resin or silicone rubber is applied thereto. As a result, it becomes easy to deform the band member 21 in a diameter expansion direction, and it is possible to relax a stress applied to the first communication member 22 at the time of the deformation.

In this embodiment, the second molded body 214 is formed to cover the outer circumferential surface 213a, the top surface 213c, and the bottom surface 213d of the first molded body 213. As a result, it is possible to improve tactile sensation of the band member 21 and provide an upscale image by increasing design quality. The thickness of the second molded body 214 (covering thickness) is not particularly limited, for example, 0.5 mm to 2 mm.

On the outer circumferential surface 213a of the first molded body 213, a plurality of holes 213h having a depth that reaches a surface of the first communication member 22 are formed. The plurality of holes 213h are formed at predetermined intervals along a longitudinal direction (circumferential direction) of the first molded body 213.

On the other hand, the second molded body 214 has a plurality of columnar portions 214p provided on an inner circumferential surface that faces the outer circumferential surface 213a of the first molded body 213. The plurality of columnar portions 214p are formed by filling a resin material that forms the second molded body 214 in the plurality of holes 213h and are formed to have a height that reaches the first communication member 22 from the outer circumferential surface 213a of the first molded body 213. As a result, by using the elasticity of the second molded body 214, it is possible to relax a stress (for example, drop impact) applied to the first communication member 22.

Figure 4A:
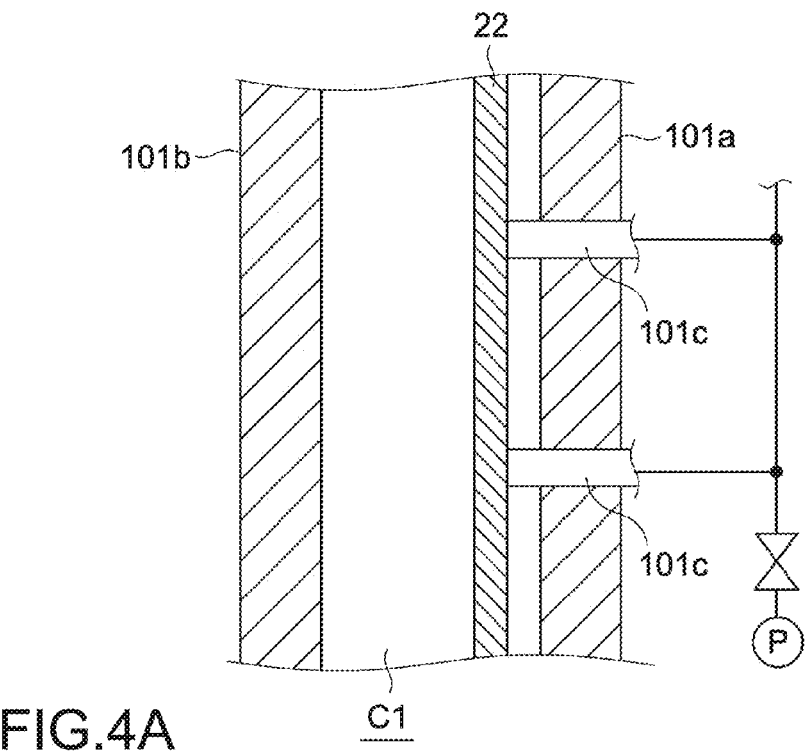
FIG. 4A is a schematic plan view of a die for explaining an example of a process of forming a band member in the head-mounted display.
Figure 4B:
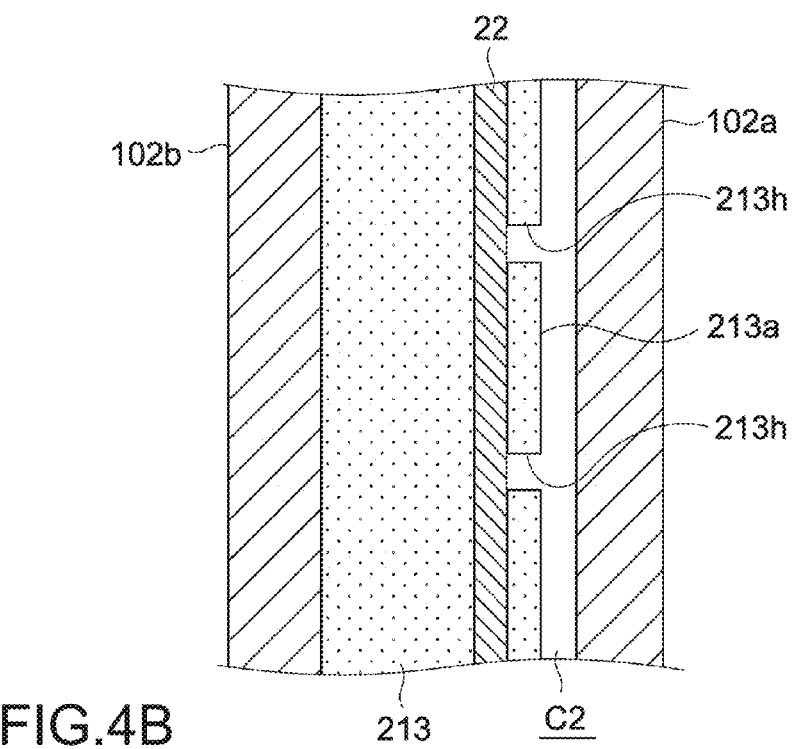
FIG. 4B is a schematic plan view of a die for explaining an example of a process of forming a band member in the head-mounted display.

FIGS. 4A and 4B are schematic plan views of molds to explain an example of a molding process of the band member 21.

The first communication member 22 is disposed in a cavity C1 in molds 101a and 101b that form the first molded body 213. At this time, as shown in FIG. 4A, in order to stably hold the posture of the first communication member 22 in the cavity C1, a plurality of holding pieces 101c are inserted in the mold 101a that forms the outer circumferential surface of the cavity C1. The plurality of holding pieces 101c enter the cavity C1 from the mold 101a and are in contact with the first communication member 22. In this embodiment, the plurality of holding pieces 101c are formed of hollow members, thereby making exhaustion possible from the inside by an external vacuum pump. As a result, it is possible to suck the first communication member 22 with tip portions of the plurality of holding pieces 101c. Thus, when the first synthetic resin material is injected in the cavity C1, the posture of the first communication member 22 is stably held in the cavity C1.

As described above, the first molded body 213 in which the plurality of holes 213h are formed in the outer circumferential surface 213a is formed. After that, as shown in FIG. 4B, the first molded body 213 is disposed in a cavity C2 in molds 102a and 102b that form the second molded body 214. Then, the second synthetic resin material is filled in the cavity C2, thereby forming the second molded body 214 having the plurality of columnar portions 214p (see, FIGS. 2 and 3). At this time, the holes 213h are sealed by the second synthetic resin material, so infiltration of water or the like from the outside is prevented.

(Ear-Hook Portion)

The support portion 20 has an ear-hook portion disposed on an inner circumferential surface of the band member 21. The ear-hook portion is constituted of a pair of ear-hook members 301 and 302 disposed on the inner circumferential surface of the band member 21. With this structure, it is possible to obtain a stable wearing feeling of the head-mounted display 100.

Figure 5A:
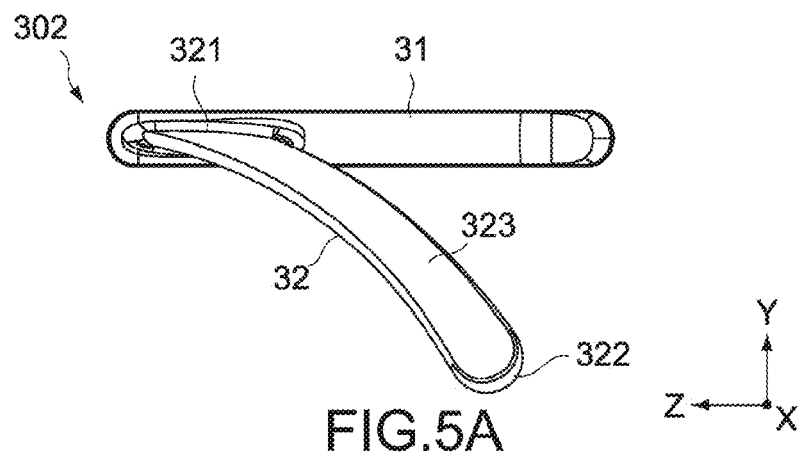
FIG. 5A is a side surface view showing an ear-hook member in the head-mounted display.
Figure 5B:
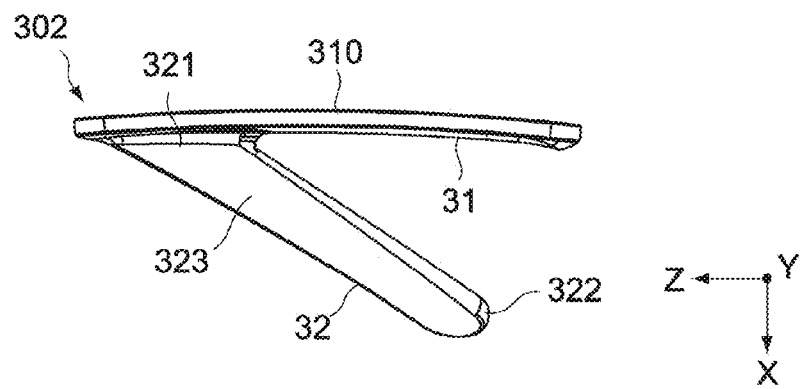
FIG. 5B is a top surface view of the ear-hook member.
Figure 5C:
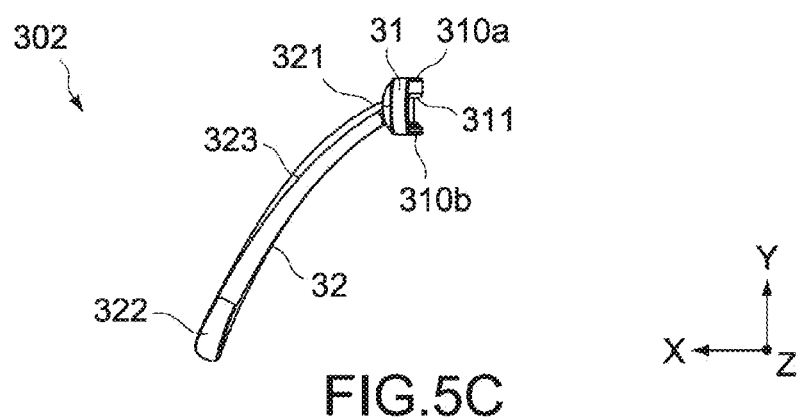
FIG. 5C is a back surface view of the ear-hook member.

The ear-hook members 301 and 302 are bilaterally symmetrically structured and have such a shape as to fit to a left ear and a right ear of the user. FIGS. 5A, 5B, and 5C are a side surface view, a top surface view, and a back surface view showing one structural example of the ear-hook member 302 for a right ear, respectively.

The ear-hook members 301 and 302 have an attachment end portion 31 provided to the band member 21 and a belt-like portion 32 provided to the attachment end portion 31.

The attachment end portion 31 is formed of a plate-like member, a longitudinal direction of which corresponds to the circumferential direction of the band member 21. On one main surface of the attachment end portion 31, along the periphery of the attachment end portion 31, a rib 310 is formed. On both long side portions of the rib 310, a pair of engagement lugs 310a and 310b opposed to each other in the Y axis direction are provided. The rib 310 surrounds an engagement portion 213e formed on the inner circumferential surface 213b of the first molded body 213 and nips the engagement portion 213e by the pair of engagement lugs 310a and 310b.

Here, the engagement portion 213e is provided in the vicinity of each of end portions 211 and 212 of the band member 21. That is, the engagement portion 213e is formed on a center portion of the band member 21 in a height direction by a predetermined length along the circumferential direction of the band member 21. The engagement portion 213e is formed integrally with the inner circumferential surface 213b of the first molded body 213 so as to have a predetermined thickness from the inner circumferential surface 213b and projections. On both side surface portions opposed in the Y axis direction of the engagement portion 213e, engagement grooves with which the pair of engagement lugs 310a and 310b are engaged are formed. With this structure, the ear-hook members 301 and 302 can be slid along the circumferential direction of the band member 21.

Figure 6:
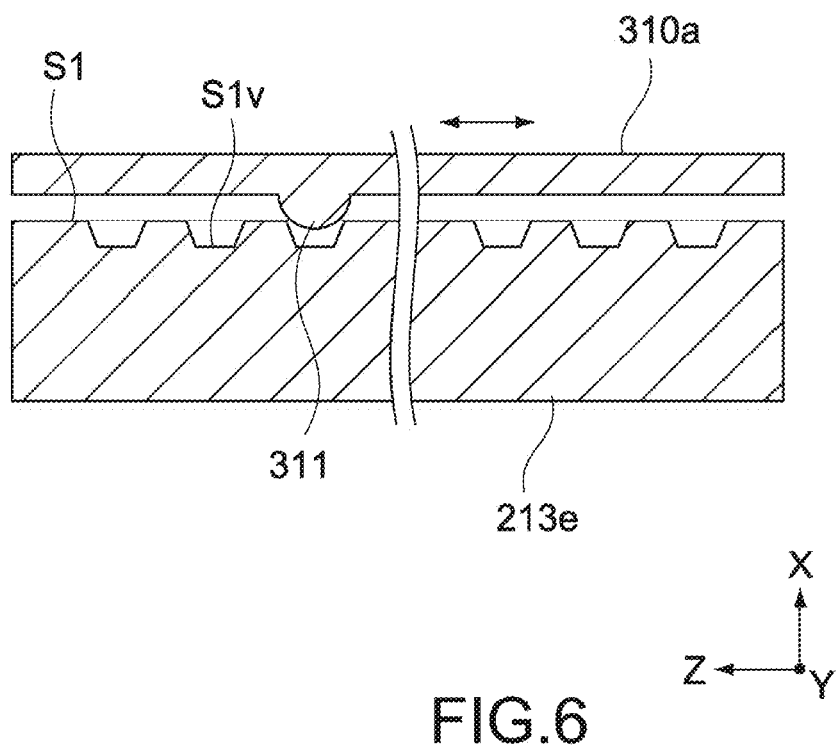
FIG. 6 is a schematic side cross-sectional view of a main portion of the band member to which the ear-hook member is attached.

FIG. 6 is a schematic side cross-sectional view of the engagement portion 213e. On a surface S1 of the engagement portion 213e opposed to the engagement lug 310a, a plurality of notches S1v are formed in a longitudinal direction. On the other hand, the engagement lug 310a has projections 311 which can be engaged with the notches S1v, respectively. As a result, the ear-hook members 301 and 302 can be slid with respect to the band member 21 while ensuring a predetermined positioning function with respect to the engagement portion 213e.

On the other hand, the belt-like portion 32 has a first end portion 321 that is fixed to the attachment end portion 31 and a second end portion 322 that is a free end and can be deformed in a radial direction of the band member 21.

The belt-like portion 32 has a main surface 323 that is opposed to a side head portion of the user. The belt-like portion 32 is twisted so as to be faced upward on a part of the main surface 323 which is closer to the first end portion 321 and is faced to the side on a part of the main surface 323 which is closer to the second end portion 322. Further, the belt-like portion 32 is slightly curved downward about the Z axis from the first end portion 321 toward the second end portion 322. When viewed from the X axis, Y axis, and Z axis directions, angles between the attachment end portion 31 and the belt-like portion 32 are approximately 30 to 50 degrees, respectively. As a result, it is possible to prevent the head-mounted display 100 from slipping off due to self weight when the user looks down.

The thickness of the belt-like portion 32 is formed in such a manner that a part on the first end portion 321 side is thinner than a part on the second end portion 322 side. The width of the main surface 323 is formed in such a manner that a part on the first end portion 321 side is wider than the second end portion 322 side. As a result, the belt-like portion 32 is easily elastically deformed in a direction approaching the band member 21 (X axis direction), and deformation thereof to a rotational direction with the aforementioned direction as an axial center (about X axis) is restricted. Thus, when the user wears the head-mounted display 100, it is possible to prevent the head-mounted display 100 from slipping off due to the self weight if the user exercises or looks down, while reducing side pressures of the ear-hook members 301 and 302 which are applied to the side head portions of the user.

When the head-mounted display 100 is mounted on the head portion of the user, the belt-like portion 32 is hung on the ear (auricle) of the user from an upper portion to a back portion thereof with the main surface 323 lightly fitted to the side head portion of the user. The pressing force of the belt-like portion 32 is set to 1 N or less, desirably, 0.5 N or less.

As a result, it is possible to reduce the pressing force applied to the head portion of the user. Therefore, it is possible to suppress an increase of fatigue due to a long use while providing an appropriate fit. Further, it is possible to reduce a reaction force of the pressing force that acts on the display portion 10, which can prevent a convergence deviation of a displayed image on the display portion 10.

The ear-hook members 301 and 302 are formed of the injection molded body of the synthetic resin material. The synthetic resin material that forms the ear-hook members 301 and 302 is not particularly limited, and in this embodiment, a resin material having an appropriate elasticity and a high toughness, for example, a polyamide-based resin is used.

The ear-hook members 301 and 302 are not limited to be formed of one resin material and may be formed of two-color molded body like the band member 21. In this embodiment, the surface of the belt-like portion 32 is covered with an elastomer material such as fluorinated resin or silicone rubber. As a result, it is possible to further improve the wearing feeling.

(Controller and Second Communication Member)

The head-mounted display 100 is provided with a controller 50. The controller 50 controls the operation of the display portion 10. The controller 50 may be a dedicated apparatus for the head-mounted display 100 or may be a general-purpose electronic apparatus such as a personal digital assistant and a smart phone. Typically, the controller 50 have various functions of transmitting an image signal to be displayed on the display portion 10 to the display portion 10 or generating an image control signal based on an input operation of the user to transmit the signal to the display portion 10.

The support portion 20 further includes a second communication member 23. The second communication member 23 is disposed in the band member 21 and electrically connects the first display portion 11 (first optical unit 112) to the controller 50. For the second communication member 23, for example, a flat interface cable is used. While the second communication member 23 is described herein as a conductive member that provides an electrical connection, embodiments are not limited as such. For example, the second communication member 23 may be an optical fiber that allows optical communication between two or more components such that the two or more components are communicatively connected.

The controller 50 transmits image signals for the right eye and the left eye to the first optical unit 112 via the second communication member 23. The image signal for the left eye is projected on the first display plate 111 by the first optical unit 112. On the other hand, the image signal for the right eye is transmitted to the second optical unit 122 via the first communication member 22 and is projected on the second display plate 121 by the second optical unit 122.

The second communication member 23 is built in an area of at least a part of the band member 21 in the circumferential direction. In this embodiment, from the first end portion 211 side toward a back area of the ear-hook member 301, the second communication member 23 is stored.

The second communication member 23 is disposed in the first molded body 213 that forms the band member 21. In this embodiment, the second communication member 23 is disposed on an inner circumferential side from the first communication member 22 in the band member 21. As a result, it is possible to store the second communication member 23 in the band member while securing an installment space for the first communication member 22.

As shown in FIG. 2, the first molded body 213 has a groove portion 213g in which the second communication member 23 is provided. The groove portion 213g is provided on approximately a center portion of a bottom surface 213d of the first molded body 213. The depth of the groove portion 213g is set so as to accommodate the second communication member 23. The first molded body 213 has a first area M1 on the outer circumferential surface 213a side and a second area M2 on the inner circumferential surface 213b side, which are opposed to each other with the groove portion 213g sandwiched therebetween, and the first communication member 22 is buried in the first area M1.

The thicknesses (widths) of the first and second areas M1 and M2 are not particularly limited and are set to 1 mm to 2 mm, for example.

The support portion 20 has a support body 24 that supports the second communication member 23. The support body 24 is formed of, for example, an injection molded body of a synthetic resin material and is fixed to the bottom surface 213d of the first molded body 213 while supporting the second communication member 23. As a result, it is possible to easily build the second communication member in the band member after the band member is manufactured.

The support body 24 has an engagement projection 240 that is engaged with a predetermined position of the groove portion 213g and is stably held with respect to the first molded body 213. The second molded body 214 that covers the bottom surface 213d covers a surrounding of the support body 24 fixed to the bottom surface 213d.

One end of the second communication member 23 is connected to the first optical unit 112. On the other hand, the other end of the second communication member 23 is drawn out from the bottom portion of the band member 21 to the outside and is connected to the controller 50. The drawn-out position of the second communication member 23 from the band member 21 is not particularly limited, but in this embodiment, the position is set to a rear side with respect to the area where the ear-hook member 301 is provided. As a result, the second communication member 23 can be outside of the field of view of the user, so it is possible to prevent visibility of an image from being hindered due to the second communication member 23.

(Operation of Head-Mounted Display)

The head-mounted display 100 of this embodiment, which is structured as described above, is mounted on the head portion of the user and used. Typically, at least a part of the band member 21 is brought into contact with the head portion or hair of the user, thereby being mounted on the head portion of the user. Alternatively, the support portion 20 can be supported on the head portion only by the ear-hook portions 301 and 302. In this case, the band member 21 may not be in contact with the head portion.

According to this embodiment, it is possible to stably dispose the display portion 10 in front of the eyes of the user without increasing the pressing force to the head portion of the user. As a result, it is possible to obtain the appropriate fit while reducing fatigue during wearing.

Further, because the first communication member 22 that electrically connects the first display portion 11 and the second display portion 12 is disposed in the band member 21, it is possible to make the first and second display portions 11 and 12 thinner or lighter. As a result, it is possible to suppress an increase in thickness or weight of the first and second display portions 11 and 12 and obtain a good wearing feeling with less fatigue.

Further, the head-mounted display 100 of this embodiment is provided with the ear-hook members 301 and 302, so a stable wearing feeling can be secured. In addition, the band member 21 is also used therewith, thereby making it possible to reduce the pressing force to the side head portions by the ear-hook members 301 and 302, as compared to a past head-mounted display of glasses type. As a result, it is possible to reduce a stress on the user and improve the wearing feeling.

Further, the ear-hook members 301 and 302 are capable of being elastically deformed with respect to the band member 21. Therefore, it is possible to suppress the reaction force of the pressing force from being transmitted to the display portion 10 through the band member 21. As a result, it is possible to prevent the convergence deviation of the images displayed on the first and second display portions 11 and 12.

In this embodiment, the belt-like portion 32 of the ear-hook members 301 and 302 is formed so as to wrap around from the upper portions of the ears to the rear portions thereof. Therefore, it is possible to support the weight of the head-mounted display on the rear portions of the ears even when the user exercises or looks down. As a result, it is possible to secure a stable wearing feeling, even if the side pressures of the ear-hook members 301 and 302 are reduced.

Further, the ear-hook members 301 and 302 can be slid along the circumferential direction of the band member 21. Therefore, it is possible to make an adjustment to an appropriate position in accordance with the size of the head portion of the user and provide an appropriate wearing feeling to all users.

Furthermore, when the head-mounted display 100 is not used, the head-mounted display 100 can be carried with the head-mounted display 100 hung on the neck of the user.

In the above, the embodiment of the present technology is described. However, the present technology is not limited to the above embodiment and can of course be variously changed without departing from the gist of the present technology.

For example, in the above embodiment, the first communication member 22 is disposed in the band member 21 by insert molding, but the forming method is not limited to this. For example, like the form of disposing the second communication member 23, a groove for accommodating the first communication member 22 is formed in advance on a predetermined position of the band member 21, and the first communication member 22 may be stored in the groove.

The first communication member 22 may not be disposed in the band member 21. For example, the first communication member 22 may be built in the connection portion 13 that connects the first display portion 11 and the second display portion 12.

The band member 21 is formed of the two-color molded body of the first molded body 213 and the second molded body 214, but may be formed of only the first molded body 213.

In addition, in the above embodiment, the first display portion 11 and the second display portion 12 are integrally connected with each other through the connection portion 13, but the first display portion 11 and the second display portion 12 may be separable from each other through the connection portion 13. A separation structure is not particularly limited and may be a mechanical engagement mechanism, a magnetic suction mechanism, or a combination of those, for example.

As described above, the connection portion 13 has the separation structure, with the result that the head-mounted display is easily hung on the neck when not used. Further, the band member is easily deformed in the diameter expansion direction, thereby making it possible to easily perform the separation operation of the display portions.

It should be noted that the present disclosure can take the following configurations.

(A1) A head-mounted display, including:
a first display portion capable of presenting an image to an eye of a user;
a second display portion capable of presenting an image to the other eye of the user; and
a support portion having a band member and a first wiring member, the band member connecting the first display portion and the second display portion with each other and being curved to be disposed around a head portion of the user, the first wiring member being disposed in the band member and electrically connecting the first display portion and the second display portion.

(A2) The head-mounted display according to Item (A1), in which
the band member has a first molded body formed of a first synthetic resin material, and
the first wiring member is insert-molded in the first molded body.

(A3) The head-mounted display according to Item (A2), in which
the band member further has a second molded body that is formed of a second synthetic resin material having a higher elasticity than the first synthetic resin material and covers at least an outer circumferential surface of the first molded body.

(A4) The head-mounted display according to Item (A3), in which
the second molded body has a plurality of columnar portions each having a height that reaches the first wiring member from the outer circumferential surface of the first molded body.

(A5) The head-mounted display according to any one of Items (A1) to (A4), in which
the first wiring member is disposed on an outer circumferential side from a neutral plane of the band member.

(A6) The head-mounted display according to any one of Items (A1) to (A5), in which
the support portion further has an ear-hook portion disposed on an inner circumferential surface of the band member.

(A7) The head-mounted display according to Item (A6), in which
the ear-hook portion is formed slideably in a circumferential direction of the band member.

(A8) The head-mounted display according to Item (A6) or (A7), in which
the ear-hook portion has
an attachment end portion attached to the band member, and
a belt-like portion attached to the attachment end portion and deformable in a radial direction of the band member.

(A9) The head-mounted display according to any one of Items (A1) to (A8), further including
a controller configured to control the first display portion and the second display portion, in which
the support portion further has a second wiring member that is disposed in the band member and electrically connects the first display portion with the controller.

(A10) The head-mounted display according to Item (A9), in which
the second wiring member is disposed on an inner circumferential side from the first wiring member in the band member.

(A11) The head-mounted display according to Item (A9) or (A10), in which the band member has a bottom surface portion where a groove portion on which the second wiring member is mounted is formed, and the support portion further has a support body that supports the second wiring member and is fixed to the bottom surface portion.

It should be understood by those skilled in the art that various modifications, combinations, sub-combinations and alterations may occur depending on design requirements and other factors insofar as they are within the scope of the appended claims or the equivalents thereof.

(1) A head-mounted display, including:

a first display portion capable of presenting an image to an eye of a user;

a second display portion capable of presenting an image to the other eye of the user; and a support portion comprising a band member and a first communication member, the band member connecting the first display portion and the second display portion with each other and being curved to be disposed around a head portion of the user, the first communication member being disposed in the band member and communicatively connecting the first display portion and the second display portion.

(2) The head-mounted display according to Item (1), in which the band member comprises a first molded body formed of a first synthetic resin material, and the first communication member is insert-molded in the first molded body.

(3) The head-mounted display according to Item (2), in which the band member further comprises a second molded body that is formed of a second synthetic resin material having a higher elasticity than the first synthetic resin material and covers at least an outer circumferential surface of the first molded body.

(4) The head-mounted display according to Item (3), in which the second molded body comprises a plurality of columnar portions each having a height that reaches the first communication member from the outer circumferential surface of the first molded body.

(5) The head-mounted display according to any one of Items (1) to (4), in which the first communication member is disposed on an outer circumferential side from a neutral plane of the band member.

(6) The head-mounted display according to any one of Items (1) to (5), in which the support portion further comprises an ear-hook portion disposed on an inner circumferential surface of the band member.

(7) The head-mounted display according to Item (6), in which the ear-hook portion is formed slideably in a circumferential direction of the band member.

(8) The head-mounted display according to Item (6) or (7), in which the ear-hook portion comprises:

an attachment end portion attached to the band member, and a belt-like portion attached to the attachment end portion and deformable in a radial direction of the band member.

(9) The head-mounted display according to any one of Items (1) to (8), further including a controller configured to control the first display portion and the second display portion, in which the support portion further comprises a second communication member that is disposed in the band member and communicatively connects the first display portion with the controller.

(10) The head-mounted display according to Item (9), in which the second communication member is disposed on an inner circumferential side from the first communication member in the band member.

(11) The head-mounted display according to Item (9) or (10), in which the band member has a bottom surface portion where a groove portion on which the second communication member is mounted is formed, and the support portion further comprises a support body that supports the second communication member and is fixed to the bottom surface portion.

(12) A head-mounted display, comprising:

a first display portion capable of presenting an image to an eye of a user;

a second display portion capable of presenting an image to the other eye of the user; and a support portion comprising a band member and an ear-hook portion that is disposed on an inner circumferential surface of the band member, the band member connecting the first display portion and the second display portion with each other and being curved to be disposed around a head portion of the user.

(13) The head-mounted display according to Item (1), in which the first communication member is a conductive member.

(14) The head-mounted display according to Item (1), in which the first communication member is an optical fiber.

(15) The head-mounted display according to Item (1), in which the first communication member is a conductive member that forms an electrical connection.

(16) The head-mounted display according to Item (4), in which the plurality of columnar portions are distributed periodically around the second molded body.

(17) The head-mounted display according to Item (1), in which the support portion further comprises a second communication member being disposed in the band member.

(18) The head-mounted display according to Item (17), in which the second communication member communicatively connects the first display portion to a controller.

(19) The head-mounted display according to Item (18), further includes a controller configured to output image signals, in which the second communication member communicatively connects the first display portion to the controller.

(20) The head-mounted display according to Item (18), in which the second communication member is disposed, at least in part, on an inner circumferential side from a neutral plane of the band member.

(21) A method of making a device, the method including:

disposing a first communication member in a first cavity formed from a first mold and a second mold; and injecting a first synthetic resin into the first cavity to form a first molded body.

(22) The method of making a device according to Item (21), in which disposing a first communication member in a first cavity comprises holding the first communication member by applying a vacuum to a plurality of hollow holding pieces that are in contact with the first communication member.

(23) The method of making a device according to Item (22), in which an outer circumferential surface of the first molded body includes a plurality of holes formed by the placement of the plurality of hollow holding pieces during injection of the first synthetic resin.

(24) The method of making a device according to Item (23), further including:

disposing the first molded body in a second cavity formed from a third mold and a fourth mold; and injecting a second synthetic resin into the second cavity to form a second molded body such that the plurality of holes are filled with the second synthetic resin.

(25) The method of making a device according to Item (24), further including disposing the first molded body in a second cavity formed from a third mold and a fourth mold.

It should be understood by those skilled in the art that various modifications, combinations, sub-combinations and alterations may occur depending on design requirements and other factors insofar as they are within the scope of the appended claims or the equivalents thereof.

What is claimed is:

1. A head-mounted display, comprising:
   a first display portion capable of presented an image to an eye of a user;
   a second display portion capable of presenting an image to the other eye of the user; and
   a support portion comprising a band member and a first communication member, the band member connecting the first display portion and the second display portion with each other and being curved to be disposed around a head portion of the user, the first communication member being disposed in the band member and communicatively connecting the first display portion and the second display portion;
   wherein the band member comprises a first molded body formed of a first synthetic resin material, the first communication member is insert-molded in the first molded body, the band member further comprises a second molded body that is formed of a second synthetic resin material having a higher elasticity than the first synthetic resin material and covers at least an outer circumferential surface of the first molded body, and the second molded body comprises a plurality of columnar portions each having a height that reaches the first communication member from the outer circumferential surface of the first molded body.

2. The head-mounted display according to claim 1, wherein
   the first communication member is disposed on an outer circumferential side from a neutral plane of the band member.

3. The head-mounted display according to claim 1, wherein
   the support portion further comprises an ear-hook portion disposed on an inner circumferential surface of the band member.

4. The head-mounted display according to claim 3, wherein
   the ear-hook portion is formed slidably in the circumferential direction of the band member.

5. The head-mounted display according to claim 3, wherein
   the ear-hook portion comprises:
   an attachment end portion attached to the band member, and
   a belt-like portion attached to the attachment end portion and deformable in a radial direction of the band member.

6. The head-mounted display according to claim 1, further comprising:
   a controller configured to control the first display portion and the second display portion, wherein
   the support portion further comprises a second communication member that is disposed in the band member and communicatively connects the first display portion with the controller.

7. The head-mounted according to claim 6, wherein
   the second communication member is disposed on an inner circumferential side from the first communication member in the band member.

8. The head-mounted display according to claim 1, wherein the first communication member is a conductive member.

9. The head-mounted display according to claim 1, wherein the first communication member is an optical fiber.

10. The head-mounted display according to claim 1, wherein the first communication member is a conductive member that forms an electrical connection.

11. The head-mounted display according to claim 1, wherein the plurality of columnar portions are distributed periodically around the second molded body.

12. The head-mounted display according to claim 1, wherein
    the support portion further comprises a second communication member being disposed in the band member.

13. The head-mounted display according to claim 12, wherein
    the second communication member communicatively connects the first display portion to a controller.

14. The had-mounted display according to claim 13 further comprising:
    a controller configured to output image signals, wherein
    the second communication member communicatively connects the first display portion to the controller.

15. The head-mounted display according to claim 13, wherein the second communication member is disposed, at least in part, on an inner circumferential side from a neutral plan of the band member.

16. A head-mounted display, comprising:
    a first display portion capable of presented an image to an eye of a user;
    a second display portion capable of presenting an image to the other eye of the user; and
    a support portion comprising a band member and a first communication member, the band member connecting the first display portion and the second display portion with each other and being curved to be disposed around a head portion of the user, the first communication member being disposed in the band member and communicatively connecting the first display portion and the second display portion a controller configured to control the first display portion and the second display portion, wherein
    the support portion further comprises a second communication member that is disposed in the band member and communicatively connects the first display portion with the controller, wherein
    the band member has a bottom surface portion where a groove portion on which the second communication member is mounted is formed, and the support portion further comprises a support body that supports the second communication member and is fixed to the bottom surface portion.

\* \* \* \* \*